Feb. 1, 1966  TATSUYA ICHIHARA ETAL  3,232,108

MASS TYPE FLOW METER

Filed Aug. 31, 1962

United States Patent Office 3,232,108
Patented Feb. 1, 1966

3,232,108
MASS TYPE FLOW METER
Tatsuya Ichihara, Nerima-ku, Tokyo, and Ichiro Ido, Meguro-ku, Tokyo, Japan, assignors to Honeywell Inc., a corporation of Delaware
Filed Aug. 31, 1962, Ser. No. 220,655
Claims priority, application Japan, Sept. 13, 1961, 36/33,460
2 Claims. (Cl. 73—209)

The present invention relates to a mass type flow meter which measures a fluid having mass $m$ and flow velocity $v$ in the form represented by mass flow $mv$.

Heretofore, the measuring elements of a conventional flow meter included a glass tube, a bearing and a spring or electrical connections and such flow meters could not be used for measuring a fluid of high temperature and pressure, such as steam. In the present invention, blades are provided on the float of the rotor of a conventional flow meter and the number of revolutions of said float, which is rotating according to the flow of the fluid to be measured and is raised to a position in proportion to the velocity of said fluid, is measured by utilizing a radiant ray emitted from a radiant ray source provided within said float. When the density of the fluid to be measured is constant the raised point of the float is proportional to the flow velocity of the fluid and when the flow velocity of the fluid is constant the raised point of the float is proportional to the density of the fluid and, therefore, either the density or the flow velocity of the fluid can be measured by utilizing either of the flow velocity or the density.

An object of the present invention is to provide a mass type flow meter which can measure a fluid of high temperature and pressure.

Another object of the present invention is to provide a mass type flow meter in which the mass flow of a fluid can be measured by means of counting the revolutions of a float with blades disposed in the fluid and rotating in proportion to the flow of the fluid and raised to a position corresponding to the density of the fluid.

Figure 1:
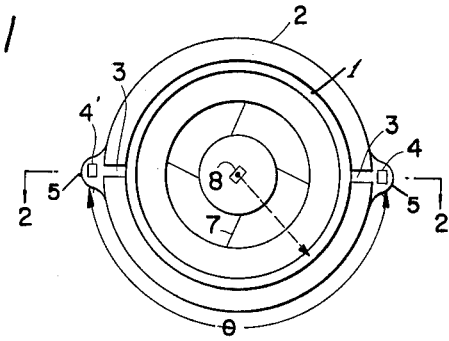
Figure 2:
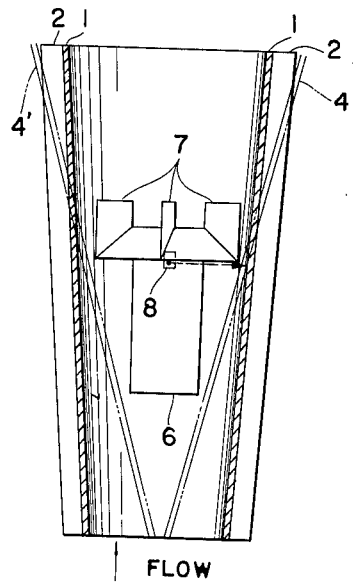
Figure 3:
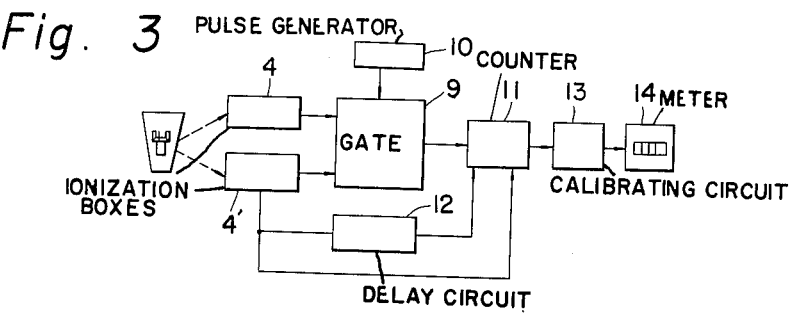

These objects will become apparent upon a study of the following specifications and drawings of which:

FIG. 1 is a plan of an embodiment of the mass type flow meter provided in accordance with the present invention, FIG. 2 is a longitudinal section of the mass type flow meter shown in FIG. 1 viewed along the line 2—2 in FIG. 1, and FIG. 3 is a block diagram showing the connection used in a recording and indicating apparatus utilizing the mass type flow meter shown in FIG. 1.

In FIGS. 1 and 2, sealing layer 2 made of lead alloy is affixed to tapered tube 1 made of metal or glass and is divided into two parts between which longitudinal slits 3 are provided spaced at an angle $\theta$ with each other. Two longitudinal ionization boxes 4 and 4' are mounted along said slits 3. Sealing layers 5 made of lead alloy are affixed outside of ionization boxes 4 and 4' and shield the radiant ray leaking out of the spaces between the slits and the boxes. A plurality of blades 7 are secured on float 6 made of a substance such as iron and source 8 of the radiant ray is embedded in the center of float 6, said source 8 emitting the radiant ray.

The operation of the mass type flow meter is effected as illustrated by using the following formulae.

Assuming that a fluid having mass $m$ and fluid velocity $v$ is directed from bottom to top of tapered tube 1 as shown by arrow in FIG. 2, float 6 raises to the point A which satisfies Formula 1 and rotates steadily in proportion to the fluid velocity.

$$v = c\sqrt{\frac{2gw_f}{m}} \qquad (1)$$

where $w_f$=weight of float 6
$c$=flow coefficient
$g$=acceleration due to gravity Formula 1 is modified as follows:

$$\frac{C^2}{v} = m \cdot v \cdot K_2 \qquad (2)$$

where $$K_2 = \frac{1}{2gw_f}$$

Then, multiplying $a$, we get $$a \cdot \frac{C^2}{v} = m \cdot v \cdot a \cdot K_2 \qquad (3)$$

where $a$=the area in which the fluid passes (in other words, the sectional area of tapered tube 1 at point A less the effective area of float 6)

Now, assuming that the angle between longitudinal ionization boxes 4 and 4' is represented by $\theta$, angle $\theta$ is given by Formula 4 as follows:

$$\theta = K_3 \cdot a \cdot C^2 \qquad (4)$$

where $K_3$=constant

Formula 3 is modified as follows:

$$\frac{1}{K_3} \cdot \frac{\theta}{v} = \frac{1}{K_3} \cdot t = m \cdot v \cdot a \cdot K_2 \qquad (5)$$

Therefore, mass flow $mva$ is obtained by measuring time $t$ in which a point on float 6 passes through angle $\theta$, in other words through the distance between longitudinal ionization boxes 4 and 4'.

Measuring time $t$ is effected by detecting the pulse of ion current generated at the time when the radiant ray emitted from source 8 strikes at longitudinal slit 3 as float 6 rotates, in other words, the duration from the time a pulse is generated in ionization box 4 to the time another pulse is generated in ionization box 4' which is spaced by angle $\theta$ from said box 4 is designated time $t$ and mass flow $mv$ is calculated by means of time $t$.

In FIG. 3 an apparatus for measuring time $t$ and indicating and recording mass flow $mv$ is shown as a block diagram. The outputs of ionization boxes 4 and 4' and the output of pulse generator 10 are connected to the input of gate 9 and the output of gate 9 is connected to an input of counter 11. Another output of ionization box 4' is connected to the inputs of counter 11 and delay circuit 12 and the output of delay circuit 12 is also connected to an input of counter 11. The output of counter 11 is connected to meter 14 for indicating and recording time $t$ and mass flow $mv$ through calibrating circuit 13.

The operation of the apparatus shown in FIG. 3 is explained as follows: Gate 9 is opened by the pulse generated in ionization box 4 and the clock pulses coming from pulse generator 10 are applied to counter 11 until gate 9 is closed by the pulse generated in ionization box 4'. The output of counter 11 is applied to indicating and recording meter 14 through calibrating circuit 13. The pulse generated in ionization box 4' closes gate 9 and at the same time the pulse is applied to counter 11 through delay circuit 12 to reset said counter 11.

From the description explained above it is understood that the present invention utilizes the fact that the float with blades provided in a tapered tube rotates in proportion to the velocity of the fluid flowing in said tapered tube and the flow velocity of the fluid can be converted into the rotating speed of the float. In the mass type flow meter, mass flow $mva$ is determined by measuring only time $t$ in which a point on said float travels the distance from an ionization box to another ionization box after converting area $a$ passed by the fluid from said one box to said another box into rotating angle $\theta$. At measuring time $t$ a combination of the radiant ray and the ionization box is utilized so that the mass flow can be measured as to a fluid of high temperature and pressure such as steam, not to mention a gaseous fluid.

It should be understood that the embodiment herewith shown described is the form of the invention at present preferred, but that the scope of the invention is not limited to the precise details of construction herein shown but is to be ascertained by reference to the appended claim.

What is claimed is:

1. Mass flow rate measuring apparatus comprising
  a tapered tube through which flows the fluid the mass flow rate of which is to be measured,
  a free float in said tube which is axially displaced to a position therein determined by the velocity and the density of said fluid,
  means to cause said float to be rotated by the fluid flow,
  and means conjointly responsive to the rotation and the axial position of said float to measure a time period required for a point on said float to rotate through an angle which is dependent upon the axial distance between said point on said float and a point on said tube,
  said time period being representative of the mass flow rate of said fluid.

2. Apparatus as specified in claim 1, wherein the last mentioned means includes a pair of elongated detectors located longitudinally of said tube and converging as they extend along said tube, and wherein an element providing an effect which is detectable by said detectors is carried by said float, said time period being that required for said float to rotate from a position in which only one of said detectors responds to said effect of said element to a position in which only the other of said detectors responds to said effect.

References Cited by the Examiner

UNITED STATES PATENTS

| 2,554,715 | 5/1951 | Mellett | 73—209 |
| 2,896,084 | 7/1959 | Mac Donald | 73—194 X |
| 3,000,210 | 9/1961 | Faure-Herman | 73—231 |

FOREIGN PATENTS 553,543  2/1958  Canada.

RICHARD C. QUEISSER, *Primary Examiner.*